Nov. 16, 1965    J. F. ANETSBERGER    3,217,575
ROTARY KNOCKOUT CUTTER
Filed Oct. 25, 1963
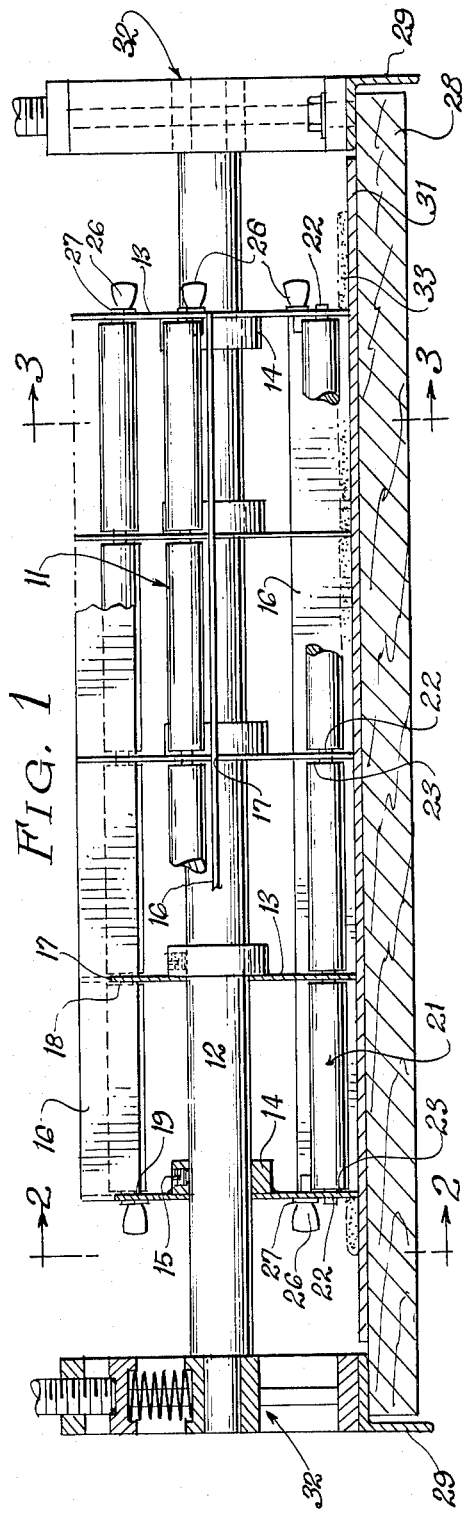
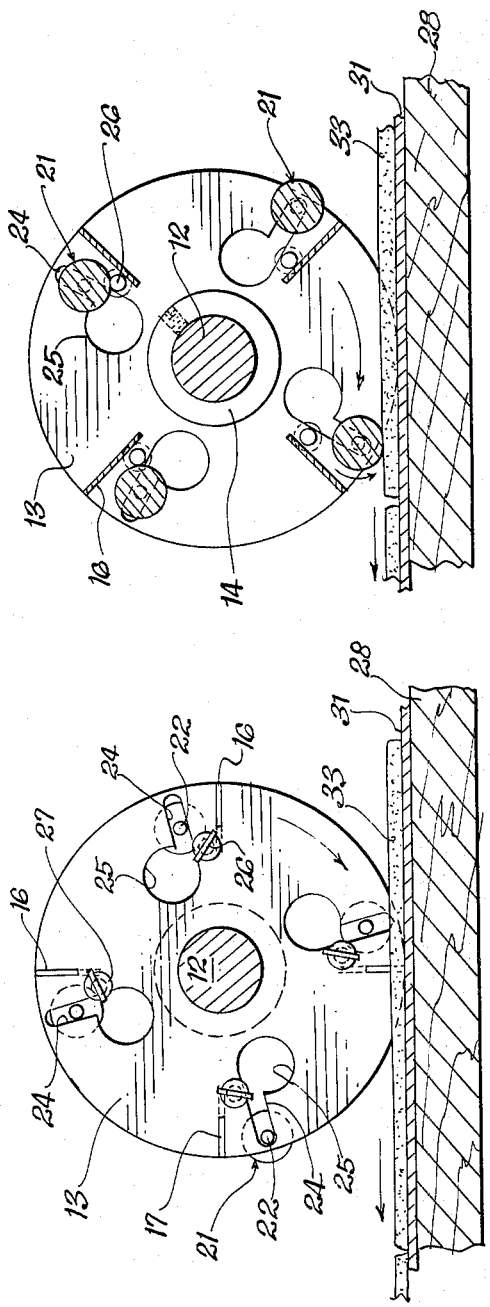
INVENTOR.
Joseph F. Anetsberger
BY Horton Davis,
Brewer & Brugman
Attys United States Patent Office 3,217,575
Patented Nov. 16, 1965

3,217,575
ROTARY KNOCKOUT CUTTER
Joseph F. Anetsberger, Northbrook, Ill., assignor to Anetsberger Brothers, Inc., Northbrook, Ill., a corporation of Illinois
Filed Oct. 25, 1963, Ser. No. 318,910
7 Claims. (Cl. 83—115)

This invention relates in general to bakery equipment, and more particularly to dough cutter apparatus.

Bakeries customarily employed dough handling equipment for mixing and sheeting dough which includes a work table provided with an endless belt conveyor for carrying the dough, usually in the form of a continuous sheet, to and through a cutting station.

A principal object of this invention is to cut such a sheet of dough into separate pieces automatically with the greatest possible facility and without displacing the resulting dough pieces relative to the conveyor belt.

A simple rotary cutter employed for this purpose, which severs the dough along any line other than one in the direction of travel of the dough, has a tendency to lift and misshape or displace the cut dough from the conveyor belt, which results in fouling up the cutter and rendering the dough useless. In fact, this precludes the use of such a simple rotary cutter in automatic dough handling equipment which includes mechanism for thereafter depositing filling material, coating, folding or otherwise automatically working on or with the severed pieces of dough.

An important object of this invention, therefore, is to provide simple and inexpensive means in association with a rotary dough cutter for retaining the dough on the surface supporting it as the cutter and dough supporting surface move relative to and away from each other.

This is accomplished by providing simple dough knockout means on a rotary cutter which are mounted for movement relative to the cutter automatically to prevent adherence of the cut dough to the cutter and, in effect, to strip the dough from the cutter. In the embodiment illustrated, these dough knockout means comprise elements mounted on the rotary cutter, substantially parallel to the axis of rotation of the cutter for limited movement relative to the cutter radially thereof and automatically moved by the cutter into engagement with the upper surface of the dough, as the adjacent part of the cutter enters the dough, and movable relative to the cutter as the adjacent part of the cutter leaves the dough so as to be maintained in surface engagement with the dough while that adjacent part of the cutter is being removed from the dough. The dough knockout elements preferably comprise rollers mounted for free rotation on axes parallel to the axis of rotation of the cutter, and the desired movements of the rollers radially of the cutter are permitted by reduced portions of the rollers extending through radial slots in the cutter.

Another object of the invention is to facilitate mounting and removal of such dough knockout means for ease both of manufacture and cleaning of the cutter, which is attained by providing enlarged apertures in the cutter communicating with the radial slots to enable movement of the roller elements relative to the cutter radially of the latter into such apertures and axially of the cutter through the apertures, with means normally blocking such movements which may selectively be rendered inoperative.

Numerous other objects and advantages of the invention will be apparent as it is better understood from the following description, which, when taken in connection with the accompanying drawings, discloses a preferred embodiment thereof.

In the drawings:

FIGURE 1 is a transverse elevational view of a dough cutter embodying the features of this invention, with parts broken away and parts in section; and FIGURES 2 and 3 are vertical sectional views taken, respectively, on the lines 2—2 and 3—3 of FIGURE 1.

Referring more particularly to the drawings, reference numeral 11 indicates in general a rotary dough cutter embodying the features of this invention which comprises a central shaft 12 and a plurality of circular cutters or cutter elements 13 parallel to each other and mounted on the shaft normal thereto and spaced axially thereof. Each of these circular cutter elements 13 preferably includes a metal ring 14 soldered or otherwise suitably secured thereto to provide a flanged hub which is secured to the shaft 12 by a set screw 15, or the like.

The rotary dough cutter 11 also comprises a plurality of transverse cutters or cutter elements 16 mounted on the circular cutter elements 13 and spaced from each other peripherally of the latter. As best seen in FIGURE 2, each of the circular cutter elements 13 is provided with a plurality of radially extending grooves 17 spaced from each other peripherally of the cutter elements which are adapted to receive the transverse cutters 16. The latter have slots 18 formed in their inner edges, as best seen in FIGURE 1, and notches 19 at the ends of their inner edges which are spaced from each other in the same manner as the circular cutters 13 and are adapted slidingly to receive the associated circular cutter elements 13 when the latter are mounted in the peripheral grooves 17. It will be understood that the slots 18 and comparable notches 19 are so dimensioned that the outer edges of the transverse cutter elements 16 will lie in the cylindrical surface defined by the peripheral edges of the circular cuttter elements 13. The several cutter elements 13 and 16 are secured together in any suitable manner to provide a unitary structure, and it will be understood that the resulting rotary cutter may be employed in well known manner to separate pieces from a sheet of dough which are peripherally defined by the adjacent cutter elements as the cutter is rotated through and relative to the dough sheet.

The present invention contemplates the provision in such a rotary dough cutter of novel dough knockout means for insuring against sticking of the dough to the cutter and carrying of the dough upwardly from its supporting surface by the cutter as the latter is rolled relative to the dough sheet. In the drawings, such means is illustrated as a plurality of dough knockout elements 21, each of which is in the form of a roller having diametrically reduced portions 22 at its ends and spaced from each other longitudinally of the roller comparable to the spacing between the circular cutter elements 13. These reduced portions 22 may be formed by cutting or turning, or those portions of the roller 21 therebetween may be separate pieces joined by pins or bolts disposed axially of the roller to form such reduced portions. Whether the roller 21 is formed as an integral member or of several parts secured together, these reduced portions 22 define radially extending shoulders 23 that are separated from each other a distance somewhat greater than the thickness of the circular cutter elements 13 so as to limit axial movements of the knockout elements 21 relative to the cutter elements.

Each of the circular cutter elements 13 is provided with a plurality of radial slots 24, as best seen in FIGURE 2, which are spaced a short distance from the transverse cutter elements 16 and are of sufficient width to loosely and slidably receive the reduced portions 22 of the knockout elements 21. The outer end of each of these radial slots 24 terminates short of the periphery of the circular cutter element 13 in which it is formed but is disposed sufficiently close thereto to permit the periphery of the associated dough knockout roller 21 to extend beyond the circular cutters 13 when in its radially outermost position.

The inner end of each of the radial slots 24 communicates with an enlarged circular aperture 25 in the cutter element 13, preferably with that edge of the slot 24 which is closest to its associated transverse cutter element 16 being substantially tangential to the aperture 25 with which it communicates. These apertures 25 are of sufficient diameter to accommodate the dough knockout rollers 21 to permit separation of the latter from the cutter by being moved axially therethrough. This is distinctly advantageous both in original assembly of the instant rotary dough cutter and to facilitate cleaning and repair or replacement.

Means are provided which normally block movement of the dough knockout elements 21 from the radial slots 24 and into the enlarged apertures 25, so that the elements 21 will be retained in operative position on the circular cutters. In the embodiment herein illustrated, that means comprises a thumb screw 26 having a flange 27 for frictional and movement-limiting engagement with the outer surface of an outermost circular cutter 13 when it is screwed into a suitable tapped aperture provided in the latter between each radial slot 24 and its associated transverse cutter element 16. These thumb screws 26 are so disposed in each of the two end circular cutter elements 13 that their inner ends, as best seen in FIGURE 3, will be engaged by the peripheral surface of the associated dough knockout roller 21 to limit inward movement of the latter radially of the rotary cutter. It will be apparent that these thumb screws 26 may be removed manually to selectively render them inoperative to enable separation of the knockout elements 21 from the cutter.

For purposes of illustrating the use of such a rotary dough cutter in connection with standard bakery equipment, a portion of a bakery table is illustrated which is indicated generally by reference numeral 28 and may be the standard type of work table employed in connection with dough mixing, sizing and rolling equipment. As shown in FIGURE 1, the work table 28 includes a pair of longitudinally extending L-shaped frame members 29 that may be supported by suitable legs in any desired manner and is provided with an endless belt conveyor having an upper run 31. Suitable bearing brackets, indicated generally by reference numeral 32, are removably secured on, and in upstanding relationship to, the frame members 29 for receiving the ends of the central shaft 12 of the rotary dough cutter 11. The bearing brackets 32 preferably are vertically adjustable in well known manner to maintain the periphery of the cutter 11 in frictional engagement with the upper surface of the conveyor belt 31. With this arrangement, movement of the upper run 31 of the belt conveyor to the left in the direction of the arrows in FIGURES 2 and 3 will result in clockwise rotation of the dough cutter 11. A sheet of dough is illustrated in the drawings as being carried by the conveyor 31 past the rotary cutter 11 and is designated therein by reference numeral 33. It will be appreciated that it is well known in the art to roll such a sheet of dough and to move the same longitudinally of the work table by means of the belt conveyor 31. It also will be appreciated from the following description of the operation of the instant cutter that the same is adaptable for manual use or for use wherein the necessary rotation of the cutter is attained in some manner other than by the above-described friction engagement between its periphery and the belt conveyor.

Refering more particularly to FIGURES 2 and 3, each dough knockout element 21 normally assumes either an innermost position, as limited by engagement with its associated thumb screws 26, or an outermost position defined by the engagement of the reduced portions 22 with the outer ends of the slots 24, in response to the forces of gravity and depending upon whether the associated slots 24 are disposed above or below a horizontal plane extending through the axis of the central shaft 12. As the sheet of dough 33 is moved past the rotary cutter 11 by the belt conveyor 31, the several circular cutter elements 13 will sever the dough sheet into longitudinally extending strips in well known manner, and the transverse cutter elements 16 will sever those strips into dough pieces of a length logitudinally of the conveyor equal to the arc of the rotary cutter element defined by adjacent transverse cutters. As previously explained, there is a tendency with such a rotary dough cutter to lift or displace the pieces which it cuts from the dough sheet upwardly from the belt conveyor or surface on which the dough is supported, and this primarily is due to the dough sticking to the transverse cutter elements as they are moved upwardly relatively to the dough supporting surface.

The instant knockout elements 21 effectively overcome this tendency by holding the dough in engagement with its supporting surface, and it is for this reason that those elements 21 are formed as freely rotatable rollers. During operation of the cutter, each knockout element 21 will assume its outermost position as it approaches the dough sheet, which is that illustrated in the lower right-hand portion of FIGURE 3. Continued rotation of the cutter from the position therein shown results in engagement of the knockout element 21 with the upper surface of the dough sheet 33 and rotation of the knockout roller as it is carried by the cutter whenever the longitudinal movement of the periphery of the roller differs in speed from that of the adjacent portion of the periphery of the circular cutter element 13. The knockout elements 21 are sufficiently light in weight as not to deform the dough sheet and leave any impression thereon, and the sheet of dough resultingly will lift the knockout roller to an intermediate position upwardly and radially of the circular cutters as the roller is moved into engagement with the dough. Such a position of one of the knockout rollers 21 is illustrated in the lower left portion of FIGURE 3.

In this same illustration, it will be be seen that as that knockout roller is moved further to the left and the adjacent portion of the rotary cutter is lifted from the dough sheet, the knockout element 21 will maintain itself in surface engagement with the associated dough piece to keep the latter on its supporting surface and separate it from the cutter. Because of the relative movement between the parts at this time, the knockout roller 21 may be rotated somewhat in the direction of the arrow shown at that point in FIGURE 3, which will effectively prevent the leaving of any surface impression in the dough by the knockout element. The relationship of the parts permits continued contact of the knockout element with the severed dough piece until limited by the outer ends of the radial slots 24, which is of sufficient duration to insure against the dough pieces being displaced from their supporting surface. This enables use of the rotary cutter in connection with any desired automatic dough handling equipment for thereafter depositing filling material on the cut dough pieces, coating them, or folding or otherwise working on or in connection therewith.

Anytime that it is desired to remove the knockout elements 21 for purposes of cleaning, repair or replacement, it is necessary only to remove the thumb screws 26, slide the knockout elements inwardly into alignment with the enlarged apertures 25 and pull the knockout elements from the cutter axially of its central shaft It is thought that the invention and many of its attendant advantages will be understood from the foregoing description, and it will be apparent that various changes will be made in the form, construction and arrangement of the parts without departing from the spirit and scope of the invention or sacrificing all of its material advantages, the form hereinbefore described being merely a preferred embodiment thereof.

I claim:

1. In bakery equipment comprising a rotary knockout dough cutter having a central shaft, a plurality of circular cutters parallel to each other and mounted on said shaft normal thereto and spaced axially thereof, and a plurality of transverse cutters extending between said circular cutters and spaced from each other peripherally of the latter, automatically operable dough knockout means, comprising a dough knockout element disposed adjacent and substantially parallel to each said transverse cutter, and mounting means comprising slots in and extending radially of said circular cutters for supporting said knockout elements on said cutter for limited movement radially thereof.

2. Bakery equipment according to claim 1, wherein each said dough knockout element comprises a roller engageable with and disengageable from a sheet of dough in time-lag relationship to the engagement and disengagement of the associated said transverse cutter and the sheet of dough as the latter is being cut thereby.

3. Bakery equipment according to claim 1, wherein each said circular cutter is provided with an enlarged aperture communicating with the inner end of each said slot to permit separation of the associated said knockout element from the cutter in a direction axially of said shaft, and means normally blocking movement of said knockout elements from said slots into said apertures and adapted to be selectively rendered inoperative to enable separation of said knockout elements from the cutter.

4. A rotary dough cutter, comprising a central shaft, circular cutter elements mounted on said shaft normal thereto, a transverse cutter element extending between said circular cutter elements, and a dough knockout element mounted on said circular cutter elements adjacent said transverse cutter element for movement relative to said cutter elements radially of said shaft.

5. A rotary cutter for rolling movement relative to a sheet of dough to sever the latter into separate pieces, comprising circular cutter elements parallel to each other and adapted to be rotated in planes perpendicular to said dough sheet, transverse cutter elements extending between said circular cutter elements and spaced from each other peripherally of the latter, and dough knockout elements mounted on said circular cutter elements adjacent said transverse cutter elements for movements relative thereto radially of said circular cutter elements.

6. In a rotary cutter according to claim 5, means for limiting movements of said dough knockout elements relative to said cutter elements comprising radial slots in said circular cutter elements, with said dough knockout elements having reduced portions extending through said slots.

7. A rotary cutter according to claim 6, wherein said circular cutter elements are provided with enlarged apertures communicating with the inner ends of said radial slots to accommodate said dough knockout elements to enable removal of the latter from said cutter, and means normally blocking movement of said knockout elements from said radial slots into said apertures and adapted to be selectively rendered inoperative to permit said knockout elements to be separated from the cutter.

References Cited by the Examiner

UNITED STATES PATENTS

| | | | |
|---|---|---|---|
| 623,862 | 4/1899 | Armstrong | 83—117 |
| 705,040 | 7/1902 | Copland | 83—112 X |
| 730,976 | 6/1903 | Scott | 83—118 X |
| 909,957 | 1/1909 | Staude | 83—116 |
| 1,751,562 | 3/1930 | Stinger | 83—115 |
| 1,781,900 | 11/1930 | Friede et al. | 83—115 |

WILLIAM W. DYER, Jr., *Primary Examiner.*

WILLIAM S. LAWSON, *Examiner.*